Figure 7:
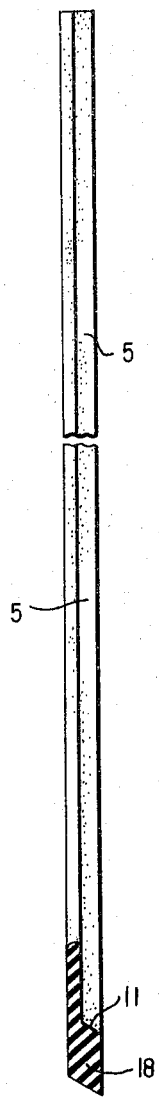

May 9, 1967 K. KIEHNLE 3,318,409
RADIATOR MOUNT
Filed March 23, 1965
2 Sheets-Sheet 1
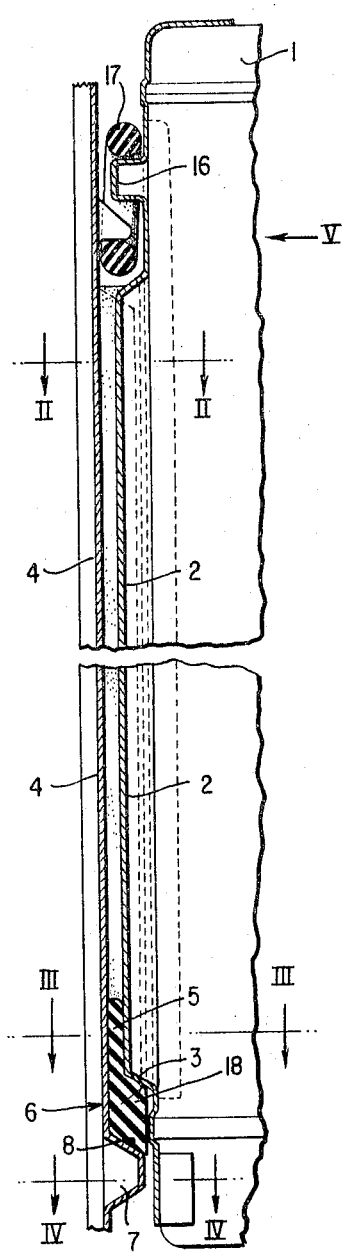
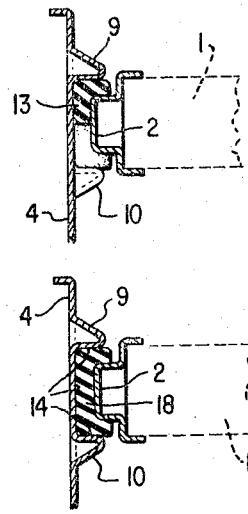
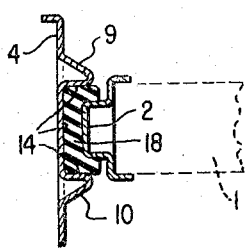
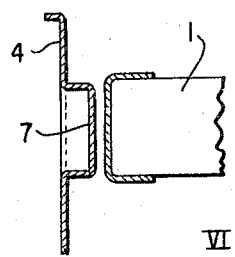
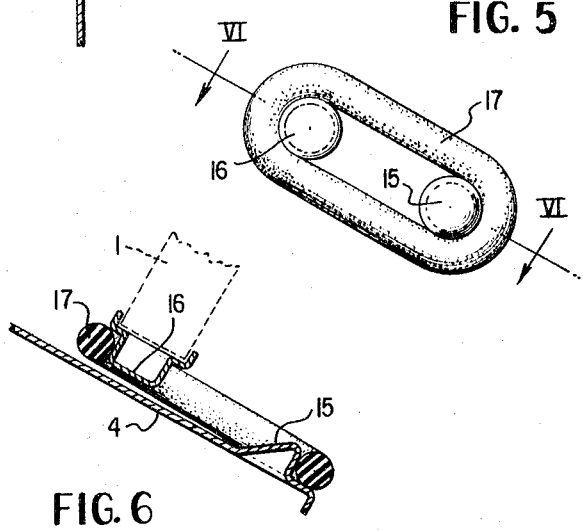
INVENTOR.
KURT KIEHNLE
BY Dicke & Craig
ATTORNEYS.

May 9, 1967 K. KIEHNLE 3,318,409
RADIATOR MOUNT

Filed March 23, 1965 2 Sheets-Sheet 2

INVENTOR.
KURT KIEHNLE

BY Dicke & Craig

ATTORNEYS.

United States Patent Office 3,318,409
Patented May 9, 1967

3,318,409
RADIATOR MOUNT
Kurt Kiehnle, Esslingen, Germany, assignor to Daimler-Benz Aktiengesellschaft, Stuttgart-Unterturkheim, Germany
Filed Mar. 23, 1965, Ser. No. 442,133
Claims priority, application Germany, Apr. 3, 1964,
D 44,070
9 Claims. (Cl. 180—68)

The present invention relates to an elastic fastening and mounting of the radiator in motor vehicles in which the radiator is provided with lateral guide means and elastic rails are arranged between the guide means and mounting supports rigidly connected with a fixed vehicle part, and in which the mounting supports are each provided with a extension directed toward the radiator which is constructed as support bearing, whereby bulge or bead-like extensions of the elastic rails are matched in the geometric configuration of the cross section thereof the support bearings of the mounting supports and the lateral guide means of the radiator are each provided with one abutment surface for the support bearings.

An elastic fastening of the aforementioned type has already been proposed in the prior art. With these prior art fastening arrangements the elastic rails serve, on the one hand, for the fastening of the radiator and, on the other, for the guidance thereof in and transversely to the driving direction, whereby the radiator in the installed condition is inserted with its guide means into the elastic rails and is connected therewith by means of screws, bolts, rivets or the like. For purposes of fixing the elastic rails with respect to the mounting supports, in this prior art arrangement, the latter are each provided with at least one bore and the elastic rail with at least one cup or pin-shaped projection whereby in the installed condition the pin-shaped projections of the elastic rails engage without play in the bores of the mounting supports.

The aim of the present invention consists in an improvement of the elastic radiator mount of the aforementioned type, especially in the advantageous simplification of the individual fastening means to be manufactured and assembled in large series production and the function thereof. The solution underlying the aims of the present invention is characterized in that on each vehicle side an elastic connection provided between fixed engagement parts of mounting support and lateral guide means of the radiator counteracts or opposes the spring forces of the elastic rails and the support bearings are so constructed that the radiator is received within the area thereof elastically in and transversely to the vehicle longitudinal axis. The elastic rails are constructed according to the present invention only as elastic intermediate members between mounting supports and lateral guide means of the radiator so that advantageously additional fastening or securing means between elastic rails and mounting supports, on the one hand, and the radiator and the elastic rails on the other, are superfluous. By the use of the elastic connections between mounting supports and lateral guide means of the radiator which oppose the spring forces of the elastic rails, the elastic rails and the rigid mounting supports may also be considerably simplified in cross section and may be made of less expensive construction whereby a considerable improvement in series assembly of the radiator is achieved.

A particularly advantageous elastic fastening and securing of the radiator is characterized according to the present invention in that the rigid engaging parts of a lateral guide means of the radiator and the corresponding mounting supports thereof are mutually offset in and perpendicularly to the vehicle longitudinal axis. From this coordination and association of the fixed engaging parts results, in addition to a securing force effective in the vehicle longitudinal direction, an effective component of the elastic connection directed toward the support bearing so that the radiator is advantageously secured elastically in all directions with simple means. A further advantage of the radiator fastening according to the present invention is a simple and advantageous construction of the elastic rails whereby the rails according to the present invention are provided outside of the bulge-like extensions thereof and the mounting supports outside of the support bearings thereof with an L-shaped profile or cross section each extending in and transversely to the driving direction. This profile or sectional construction enables, on the one hand, a saving in material of the mounting supports and of the elastic rails, and on the other hand, there is achieved thereby an advantageous assembly simplification of the radiator. The aforementioned advantages are achieved in particular with an appropriate constructional form of the elastic connection by the present invention in that the fixed engaging parts are constructed as pin or cup-shaped projections and are under the effect of an elastic ring or band. A further feature of the present invention concerns the advantageous construction of the support bearings according to which the latter are provided in cross section with a U-shaped profile open in the direction toward the radiator and in longitudinal cross section with an abutment surface inclined with respect to the radiator. The radiator is thereby elastically received and guided advantageously within the area of the support bearings vertically as well as in and transversely to the vehicle longitudinal axis.

Accordingly, it is an object of the present invention to provide an elastic radiator mount of the type described above which further improves the prior mounts by simple means.

Another object of the present invention resides in the provision of an elastic radiator securing and fastening arrangement which excels by a particularly favorable design simplification of the various parts thereof.

A further object of the present invention resides in the provision of a radiator mounting arrangement for motor vehicles which is particularly useful for mass production by its ease of manufacture and installation of the various parts thereof.

Still another object of the present invention resides in the provision of a radiator fastening and securing means for motor vehicles which obviates unnecessary fastening means between the elastic rails and the mounting supports, on the one hand, and the radiator and the elastic rails, on the other.

A still further object of the present invention resides in the provision of a radiator fastening and mounting arrangement in which elastic connections are provided counteracting the spring forces of the elastic rails, thereby achieving a considerable improvement for series production and assembly of the radiator.

Still a further object of the present invention resides in the provision of a radiator mount for motor vehicle radiators which assures by simple means an elastic mounting of the radiator offering a yieldingness in all directions.

Another object of the present invention resides in the provision of an elastic radiator mount which entails considerable savings in materials, facilitates installation and permits a simple design of the parts involved.

These and other objects, features and advantages of the present invention will become more obvious from the following description when taken in connection with the accompanying drawing which shows, for purposes of illustration only, one embodiment in accordance with the present invention, and wherein FIGURE 1 is an elevational view, partly in cross section, of the left-hand radiator mounting arrangement in accordance with the present invention, as viewed in the driving direction, the right-hand mounting arrangement being of mirror-image-like construction.

FIGURES 2, 3 and 4 are partial cross sectional views, through the radiator mount of FIGURE 1, taken along lines II—II, III—III, and IV—IV, respectively.

Figure 8:
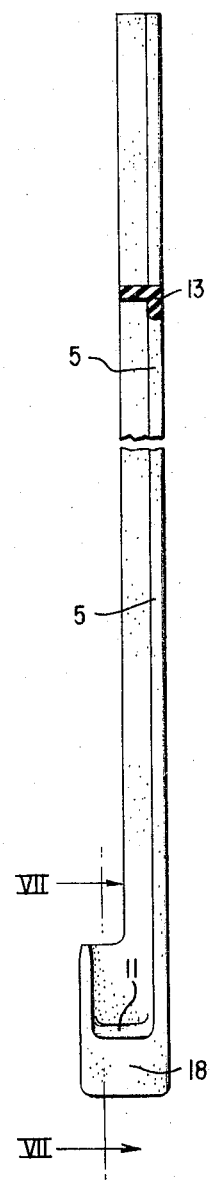
Figure 9:
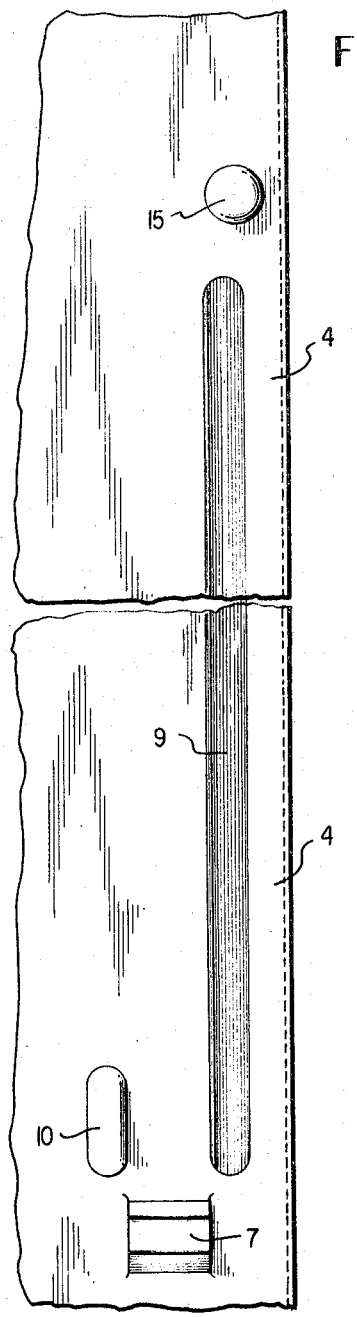

FIGURE 5 is an enlarged elevational view of the elastic connection between the mounting support and lateral guide means of the radiator mount in accordance with the present invention, as viewed in the direction of arrow V in FIGURE 1, FIGURE 6 is a partial cross sectional view, taken along line VI—VI of FIGURE 5, FIGURE 7 is a cross sectional view through an elastic rail taken along line VII—VII of FIGURE 8, FIGURE 8 is a side elevational view of the elastic rail of FIGURE 7, and FIGURE 9 is a side elevational view of the mounting support in accordance with the present invention.

Referring now to the drawing wherein like reference numerals are used throughout the various views to designate like parts, reference numeral 1 designates therein a conventional radiator of a motor vehicle (not shown). The radiator 1 is provided with lateral guide members 2 which have a cross section as illustrated more fully in FIGURES 2 and 3 and which are provided at the ends thereof facing the vehicle floor with inclined abutment surfaces 3 (FIG. 1). The radiator 1 is received with the abutment surfaces 3 thereof within mounting supports 4 having a cross section illustrated more particularly in FIGURES 2, 3 and 4. Elastic rails 5 are provided between the guide members 2 and the mounting supports 4. The mounting supports 4 are connected in any suitable known manner (not shown) with a fixed vehicle part and are constructed within the area of the abutment surfaces 3 of the radiator 1 as support bearings generally designated by reference numeral 6 (FIG. 1). The support bearings 6 are provided for that purpose with bosses or abutments 7 having inclined abutment surfaces 8 as well as with lateral guide means 9 and 10 (FIGS. 2, 3 and 9) whereby the support bearings 6 form in cross section a U-shaped profile 14 (FIG. 3) open in the lateral direction toward the radiator 1.

The elastic rails 5 have an L-shaped profile 13 (FIG. 8) and are provided within the area of the support bearings 6 with bulge-like or bead-like extensions 18 (FIGS. 1, 3, 7 and 8) which are matched to the support bearings 6 by a U-shaped profile in cross section and by inclined surfaces 11 and 12 (FIG. 7) in longitudinal cross section. In the installed position, the L-shaped profile 13 of the elastic rails 5 extends in and transversely to the driving direction whereby the rails 5 abut against correspondingly constructed sectional guide means 9 of the mounting support 4.

Within the upper area of the radiator mounting according to the present invention, pin or cup-shaped projections 15 of the mounting support 4 (FIGS. 1, 5, 6 and 9) as well as pin or cup-shaped projections 16 (FIGS. 1, 5 and 6) of the associated lateral guide means 2 of the radiator 1 are mutually offset in and transversely to the longitudinal direction of the vehicle and are connected with each other by elastic rings 17.

While I have shown and described one embodiment in accordance with the present invention, it is understood that the same is not limited thereto but is susceptible of numerous changes and modifications as known to a person skilled in the art and I therefore do not wish to be limited to the details shown and described herein but intend to cover all such changes and modifications as are encompassed by the scope of the appended claims.

I claim:

1. An elastic securing arrangement of the radiator in motor vehicles having relatively fixed vehicle parts, comprising:
   lateral guide means secured to the radiator,
   mounting support means secured to said relatively fixed vehicle parts and having each an extension directed toward the radiator which constitutes a support bearing means,
   the lateral guide means being each provided with abutment surface means,
   and means elastically supporting the radiator at said fixed parts including elastic rail means disposed between said lateral guide means and said mounting support means, said elastic rail means having bulge-like extensions matched in the geometric construction of the cross section thereof to the support bearing means of said mounting support means, and further elastic connecting means on each vehicle side between fixed parts provided on said lateral guide means and said mounting support means and operable to oppose the spring forces of the elastic rail means,
   and said support bearing means being of such construction that the radiator is received within the area thereof elastically in and transversely to the vehicle longitudinal axis.

2. An elastic securing arrangement of the radiator in motor vehicles having relatively fixed vehicle parts, comprising:
   lateral guide means secured to the radiator,
   mounting support means secured to said relatively fixed vehicle parts and having each an extension directed toward the radiator which constitutes a support bearing means,
   the lateral guide means being each provided with abutment surface means,
   and means elastically supporting the radiator at said fixed parts including elastic rail means disposed between said lateral guide means and said mounting support means, said elastic rail means having bulge-like extensions matched in the geometric construction of the cross section thereof to the support bearing means of said mounting support means, and further elastic connecting means on each vehicle side between fixed parts provided on said lateral guide means and said mounting support means and operable to oppose the spring forces of the elastic rail means,
   and said support bearing means being of such construction that the radiator is received within the area thereof elastically in and transversely to the vehicle longitudinal axis,
   the fixed parts of a respective lateral guide means and of a corresponding mounting support means being mutually offset in and perpendicularly to the vehicle longitudinal axis.

3. An elastic securing arrangement of the radiator in motor vehicles having relatively fixed vehicle parts, comprising:
   lateral guide means secured to the radiator,
   mounting support means secured to said relatively fixed vehicle parts and having each an extension directed toward the radiator which constitutes a support bearing means,
   the lateral guide means being each provided with abutment surface means,
   and means elastically supporting the radiator at said fixed parts including elastic rail means disposed between said lateral guide means and said mounting support means, said elastic rail means having bulge-like extensions matched in the geometric construction of the cross section thereof to the support bearing means of said mounting support means, and further elastic connecting means on each vehicle side between fixed parts provided on said lateral guide means and said mounting support means and operable to oppose the spring forces of the elastic rail means, and said support bearing means being of such construction that the radiator is received within the area thereof elastically in and transversely to the vehicle longitudinal axis, the elastic rail means being each provided outside of the area of the bulge-like extensions thereof and the mounting support means outside of the area of the support bearing means with an angular cross section extending in and transversely to the driving direction.

4. An elastic securing arrangement of the radiator in motor vehicles having relatively fixed vehicle parts, comprising:

lateral guide means secured to the radiator, mounting support means secured to said relatively fixed vehicle parts and having each an extension directed toward the radiator which constitutes a support bearing means, the lateral guide means being each provided with abutment surface means, and means elastically supporting the radiator at said fixed parts including elastic rail means disposed between said lateral guide means and said mounting support means, said elastic rail means having bulge-like extensions matched in the geometric construction of the cross section thereof to the support bearing means of said mounting support means, and further elastic connecting means on each vehicle side between fixed parts provided on said lateral guide means and said mounting support means and operable to oppose the spring forces of the elastic rail means, and said support bearing means being of such construction that the radiator is received within the area thereof elastically in and transversely to the vehicle longitudinal axis, said fixed parts being constructed as pin-shaped projections, and said further elastic connecting means including elastic ring means connecting said fixed parts.

5. An elastic securing arrangement of the radiator in motor vehicles having relatively fixed vehicle parts, comprising:

lateral guide means secured to the radiator, mounting support means secured to said relatively fixed vehicle parts and having each an extension directed toward the radiator which constitutes a support bearing means, the lateral guide means being each provided with abutment surface means, and means elastically supporting the radiator at said fixed parts including elastic rail means disposed between said lateral guide means and said mounting support means, said elastic rail means having bulge-like extensions matched in the geometric construction of the cross section thereof to the support bearing means of said mounting support means, and further elastic connecting means on each vehicle side between fixed parts provided on said lateral guide means and said mounting support means, and operable to oppose the spring forces of the elastic rail means, and said support bearing means being of such construction that the radiator is received within the area thereof elastically in and transversely to the vehicle longitudinal axis, and said support bearing means having in cross section a U-shaped profile open in the direction toward the radiator and being provided in longitudinal cross section with an abutment surface inclined with respect to the radiator.

6. An elastic securing arrangement of the radiator in motor vehicles having relatively fixed vehicle parts, comprising:

lateral guide means secured to the radiator, mounting support means secured to said relatively fixed vehicle parts and having each an extension directed toward the radiator which constitutes a support bearing means, the lateral guide means being each provided with abutment surface means, and means elastically supporting the radiator at said fixed parts including elastic rail means disposed between said lateral guide means and said mounting support means, said elastic rail means having bulge-like extensions matched in the geometric construction of the cross section thereof to the support bearing means of said mounting support means, and further elastic connecting means on each vehicle side between fixed parts provided on said lateral guide means and said mounting support means, and operable to oppose the spring forces of the elastic rail means, and said support bearing means being of such construction that the radiator is received within the area thereof elastically and transversely to the vehicle longitudinal axis, the fixed parts of a respective lateral guide means and of a corresponding mounting support means being mutually offset in and perpendicularly to the vehicle longitudinal axis, said fixed parts being constructed as pin-shaped projections, and said further elastic connecting means including elastic ring means connecting said fixed parts.

7. An elastic securing arrangement of the radiator in motor vehicles having relatively fixed vehicle parts, comprising:

lateral guide means secured to the radiator, mounting support means secured to said relatively fixed vehicle parts and having each an extension directed toward the radiator which constitutes a support bearing means, the lateral guide means being each provided with abutment surface means, and means elastically supporting the radiator at said fixed parts including elastic rail means disposed between said lateral guide means and said mounting support means, said elastic rail means having bulge-like extensions matched in the geometric construction of the cross section thereof to the support bearing means of said mounting support means, and further elastic connecting means on each vehicle side between fixed parts provided on said lateral guide means and said mounting support means, and operable to oppose the spring forces of the elastic rail means, and said support bearing means being of such construction that the radiator is received within the area thereof elastically in and transversely to the vehicle longitudinal axis, the fixed parts of a respective lateral guide means and of a corresponding mounting support means being mutually offset in and perpendicularly to the vehicle longitudinal axis, said fixed parts being constructed as pin-shaped projections, and said further elastic connecting means including elastic ring means connecting said fixed parts, said support bearing means having in cross section a U-shaped profile open in the direction toward the radiator and being provided in longitudinal cross section with an abutment surface inclined with respect to the radiator.

8. An elastic fastening arrangement for the radiator in motor vehicles having a relatively fixed vehicle part, comprising lateral guide means on said radiator, mounting support means on said relatively fixed vehicle part, the lateral guide means and mounting support means being each provided with spaced cooperating abutment surface means, and means elastically supporting the radiator on said fixed part in and transversely to the longitudinal direction of the vehicle including elastic rail means disposed between said lateral guide means and said mounting support means and having an extension substantially fitting into the space between cooperating abutment surface means, and further elastic connecting means on each vehicle side between said lateral guide means and said mounting support means to oppose the spring forces of the elastic rail means.

9. An elastic fastening arrangement for the radiator in motor vehicles having a relatively fixed vehicle part, comprising:

lateral guide means on said radiator, mounting support means on said relatively fixed vehicle part, the lateral guide means and mounting support means being each provided with spaced cooperating abutment surface means, and means elastically supporting the radiator on said fixed part in and transversely to the longitudinal direction of the vehicle including elastic rail means disposed between said lateral guide means and said mounting support means and having an extension substantially fitting into the space between cooperating abutment surface means, and further elastic connecting means on each vehicle side between said lateral guide means and said mounting support means, to oppose the spring forces of the elastic rail means, including associated projections offset in the vertical and longitudinal directions and elastic means elastically holding said projections in predetermined position.

References Cited by the Examiner

UNITED STATES PATENTS

| | | | |
|---|---|---|---|
| 1,087,519 | 2/1914 | White | 180—68 |
| 1,282,451 | 10/1918 | Moore | 180—68 |
| 1,339,752 | 5/1920 | Franz | 248—358 X |
| 1,593,245 | 7/1926 | Cutler | 180—68 |
| 1,834,709 | 12/1931 | Ihde | 180—68 |
| 2,755,874 | 7/1956 | Adloff | 180—68 |
| 3,121,467 | 2/1964 | Bryant | 180—68 |
| 3,123,170 | 3/1964 | Bryant | 180—68 |

MILTON BUCHLER, *Primary Examiner.*

MILTON L. SMITH, *Assistant Examiner.*